United States Patent Office 3,763,066
Patented Oct. 2, 1973

3,763,066
THERMAL STABILIZATION OF PIGMENTED POLYOLEFIN CONTAINING NICKEL COMPLEX
Joseph Anthony Stretanski, Clinton, N.J., assignor to American Cyanamid Company, Stamford, Conn.
No Drawing. Filed May 4, 1972, Ser. No. 250,260
Int. Cl. C08f *19/14*
U.S. Cl. 260—23 H       6 Claims

ABSTRACT OF THE DISCLOSURE

Polyolefins containing (a) a nickel amine or nickel alkanolamine complex of 2,2'-thiobis(p-alkylphenol) to inhibit degradation by ultraviolet radiation and (b) a cadmium sulfide, cadmium selenide, or a cadmium sulfoselenide pigment can be stabilized against thermal discoloration by incorporation therein of a zinc salt of an alkanoic monocarboxylic acid of 8 to 20 carbon atoms, such as zinc stearate.

---

This invention relates to protecting against thermal discoloration polyolefins which contain (a) nickel amine or nickel alkanolamine complexes of 2,2'-thiobis(p-alkylphenol) to stabilize the polyolefin against degradation by ultraviolet radiation and (b) a cadmium sulfide, cadmium selenide, or a cadmium sulfoselenide pigment by incorporating therein a zinc salt of an alkanoic monocarboxylic acid of 8 to 20 carbon atoms.

Nickel amine and nickel alkanolamine complexes of 2,2'-thiobis(p-alkylphenols) are well known and widely used to stabilize polyolefins against degradation by ultraviolet radiation. These complexes, which are characterized by a single nitrogen-to-nickel coordinate bond and a single nickel-to-sulfur coordinate bond for each nickel atom in the complex molecule, may be represented by the formula:

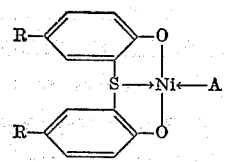

wherein each R is an alkyl group of 1 to 18 carbon atoms and A is a member selected from the group consisting of primary aliphatic amines, primary aromatic amines, cyclic secondary amines, and alkanolamines. Foster U.S. Pats. 3,215,717 and 3,313,770 discloses many of these complexes wherein A is an amine and Murray et al. U.S. Pat. 3,636,023 discloses many of these complexes wherein A is an alkanolamine. As disclosed in Stretanski et al. application No. 240,764, filed Apr. 3, 1972, a preferred nickel amine complex is the one wherein the primary aliphatic amine is cyclohexylamine.

As disclosed in the aforesaid references, these complexes are all very effective for stabilizing polyolefins against degradation on exposure to ultraviolet radiation. Illustrative of the polyolefins wherein these complexes may be used are polyethylene and polypropylene, and the like.

It is also known to use various pigments in polyolefins to impart color to the products formed. Among the pigments used are cadmium sulfide, cadmium selenide, and cadmium sulfoselenide. Some of these pigments are C.I. Nos. 77,196; 77,199; and 77,202, also identified as C.I. Pigment Red 108, C.I. Pigment Yellow 37, and C.I. Pigment Orange 20 and sold by many sources as Cadmium Reds, Cadmium Yellows, and Cadmium Oranges and also sold as Cadmium Maroon, Cadmopone Red, Cadmopur Red, Aurora Yellow, Cadmium Golden, Cadmium Lemon Yellow, and Cadmium Primrose, etc.

In such uses, typically the complex and the pigment are blended with the polyolefin in the desired proportions, conventionally from about 0.01% to about 5% (preferably from about 0.2% to about 2%) of the complex and from about 0.1% to about 5% (depending on intensity of color desired) of the pigment based on weight of polymer and the blend is then molded to form a finished article, as by injection molding, extruding, blow-molding, and fiber spinning. Since these molding processes normally involve the use of elevated temperatures, the complex and the pigment used are subjected to conditions causing thermal degradation thereof, possibly involving reaction between the nickel of the complex and the sulfur or selenium of the pigment, resulting in undesirable color changes.

In accordance with the present invention, it has now been found that the resistance to thermal degradation of polyolefins containing these nickel amine or nickel alkanolamine complexes of 2,2' - thiobis(p-alkylphenol) in combination with these cadmium sulfide, cadmium selenide, or cadmium sulfoselenide pigments can be remarkably improved by the presence of a zinc salt of an alkanoic monocarboxylic acid of 8 to 20 carbon atoms. Illustrative of such zinc salts are zinc caprylate, zinc caprate, zinc laurate, zinc myristate, zinc palmitate, zinc stearate, and zinc arachate, although for reasons of cost and commercial availability, zinc stearate is preferred. The zinc salt can be incorporated in the polyolefin in any manner, such as the modes used for incorporation of the pigment and complex. Such zinc salt will usually be used in an amount of about 0.05% to about 3% (preferably from about 0.1% to about 1%) based on weight of polymer, with the weight ratio of zinc salt to nickel complex being between about 0.1 to about 1.0 and the weight ratio of zinc salt to pigment being between about 0.05 and 1.0. The exact concentration of zinc salt chosen will, of course, be a function of several variables, such as the highest temperature to which the polyolefin containing the complex and the pigment will be exposed, the amount of time of such exposure to elevated temperature, the amount of discoloration which can be tolerated for those uses where the absolute minimum of discoloration is not absolutely necessary, the concentrations of pigment and complex used, etc.

Surprisingly, it was found that other closely related zinc salts do not produce the desirable stability against discoloration due to thermal degradation of the polyolefin containing the nickel amine or nickel alkanolamine complex with the cadmium sulfide, cadmium selenide, or cadmium sulfoselenide pigment. Thus, the unsuitable zinc salts include zinc sebacate, zinc oxalate, zinc nicotinate, zinc phosphate, zinc phosphite, and zinc naphthenate.

The complex, pigment, and zinc salt are advantageously used in the polymer substrates in combination with other additives or secondary stabilizers such as ultraviolet light absorbers, dyes, other pigments, hindered phenol antioxidants, lubricants, secondary stabilizers such as dilauryl- and distearyl-thiodipropionates, etc. Illustrative of the ultraviolet light absorbers are those mentioned in col. 3, lines 14–55 of Bright U.S. Pat. 3,636,022 and col. 4, lines 1–17 of Murray et al., U.S. Pat. 3,636,023.

This invention is further illustrated by the following examples.

EXAMPLE I 50 grams of polypropylene powder was dry blended with 0.5 gram of the nickel n-butylamine complex of 2,2'-thiobis(p-t-octylphenol), 1.0 gram of cadmium sulfide or cadmium sulfoselenide pigment as indicated in the following table, and 0.15 gram of zinc stearate when used. Each blended mixture was milled on a standard plastic mill. The milled samples were cut into strips and inserted into a Melt Index Apparatus at 290° C. and an extrudate removed every minute for 10 minutes and the color noted in order to obtain a thermal discoloration profile for each composition. The data obtained are reported in the following table.

COLOR OF HEAT AGED POLYPROPYLENE

| Sample* | Aging at 290° C. after— | | | |
|---|---|---|---|---|
| | 2 min. | 5 min. | 7 min. | 10 min. |
| 2.0% CdS yellow | Yellow | Sl. greenish-yellow. | Greenish-yellow. | Yellow-green. |
| 2.0% CdS plus 0.3% ZnSt. | do | Yellow | Yellow | Yellow. |
| 2.0% CdSSe red | Red | Brownish-red | Reddish-brown. | Reddish-brown. |
| 2.0% CdSSe plus 0.3% ZnSt. | Red | Red | Red | Red. |

*CdS is cadmium sulfide; ZnSt is zinc stearate; CdSSe is cadmium sulfoselenide.

The data in the above table clearly indicate the inhibition of thermal discoloration of polyolefin containing nickel amine complex and these pigments by the presence of the zinc salt of an alkanoic monocarboxylic acid in accordance with the present invention.

EXAMPLE II

Four dry blends of polypropylene powder, 0.4% antioxidant mixture of equal amounts of phenyldidecylphosphite and methylene-bis(2,4-dinonylphenol), 0.2% distearylthiodipropionate, 0.5% nickel n-butylamine complex of 2,2'-thiobis(p-t-octylphenol), and 2.0% bright yellow cadmium sulfide pigment were prepared. One sample was used as a control without further addition, and the other three samples also had either 0.3% zinc stearate, or 0.3% calcium stearate, or 0.3% zinc oxide incorporated therein. Each blend sample was extruded through an extruder having a temperature profile of 440° F.–470° F.– 480° (corresponding to the ends and middle of the extruder barrel) wherein the polymer residence time was 1 minute. After extrusion, the control sample was olive green, the sample containing zinc stearate was bright yellow with a slight greenish cast, the sample containing calcium zinc oxide was mustard yellow.

This example illustrates the effectiveness of the zinc salt of an alkanoic monocarboxylic acid and provides a comparison with another (calcium) salt of the same acid and with another zinc compound (zinc oxide).

I claim:

1. A polyolefin composition comprising a polymer of a mono-olefin containing, in combination,
    (a) a nickel amine or nickel alkanolamine complex of 2,2'-thiobis(p-alkylphenol) wherein each alkyl group has up to 18 carbon atoms, said complex being present in an amount effective to stabilize said polyolefin against degradation by ultraviolet radiation;
    (b) a cadmium sulfide, cadmium selenide, or cadmium sulfoselenide pigment; and
    (c) a zinc salt of an alkanoic monocarboxylic acid of 8 to 20 carbon atoms, said zinc salt being present in an amount effective to stabilize said composition against thermal degradation.

2. A composition as defined in claim 1 wherein said nickel complex is present in an amount of 0.01 to 5 percent on weight of polymer, said pigment is present in an amount of 0.1 to 5 percent on weight of polymer, and said zinc salt is present in an amount of 0.05 to 3 percent on weight of polymer.

3. A composition as defined in claim 1 wherein said zinc salt is zinc stearate.

4. A composition as defined in claim 1 wherein said nickel complex is nickel n-butylamine complex of 2,2'-thiobis(p-t-octylphenol).

5. A composition as defined in claim 1 wherein said nickel complex has the formula

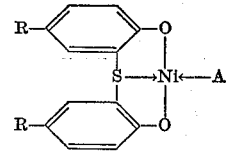

wherein each R is an alkyl group of 1 to 18 carbon atoms and A is a member selected from the group consisting of primary aliphatic amines, primary aromatic amines, cyclic secondary amines, and alkanolamines.

6. A composition as defined in claim 1 wherein said polymer is polyethylene or polypropylene.

References Cited
UNITED STATES PATENTS

| 3,215,717 | 11/1965 | Foster | 260—439 R |
| 3,313,770 | 4/1967 | Foster | 260—45.75 N |
| 3,636,092 | 1/1972 | Murray | 260—439 R |
| 3,542,712 | 11/1970 | Gorton | 260—23 H |

OTHER REFERENCES

"Modern Plastics Encyclopedia," 1962, p. 492 relied on.

DONALD E. CZAJA, Primary Examiner

W. E. PARKER, Assistant Examiner

U.S. Cl. X.R.
260—41, 45.75 N

Case 23,467 - PM

UNITED STATES PATENT OFFICE
CERTIFICATE OF CORRECTION

Patent No. 3,763,066          Dated October 2, 1973

Inventor(s) Joseph Anthony Stretanski

It is certified that error appears in the above-identified patent and that said Letters Patent are hereby corrected as shown below:

Column 3, Example II, lines 40-41: After "calcium" and before "zinc oxide" insert -- stearate was greenish yellow, and the sample containing --

Signed and sealed this 5th day of February 1974.

(SEAL)
Attest:

EDWARD M. FLETCHER, JR.
Attesting Officer

RENE D. TEGTMEYER
Acting Commissioner of Patents